Jan. 14, 1969      E. I. VALYI      3,421,577

COMPOSITE POROUS STRUCTURE

Original Filed June 12, 1962      Sheet __1__ of 4

INVENTOR:
EMERY I. VALYI
BY Robert N. Bachwau
ATTORNEY

Jan. 14, 1969 E. I. VALYI 3,421,577
COMPOSITE POROUS STRUCTURE
Original Filed June 12, 1962 Sheet 2 of 4

INVENTOR:
EMERY I. VALYI
BY
Robt N Brehman
ATTORNEY

INVENTOR.
EMERY I. VALYI

BY
ATTORNEY

Jan. 14, 1969     E. I. VALYI     3,421,577

COMPOSITE POROUS STRUCTURE

Original Filed June 12, 1962     Sheet 4 of 4

INVENTOR:
EMERY I. VALYI

BY
ATTORNEY

United States Patent Office 3,421,577
Patented Jan. 14, 1969

3,421,577
COMPOSITE POROUS STRUCTURE
Emery I. Valyi, Riverdale, N.Y., assignor to Olin Mathieson Chemical Corporation, a corporation of Virginia
Continuation of application Ser. No. 499,130, Aug. 30, 1965, now abandoned, which is a division of application Ser. No. 398,128, Sept. 21, 1964, now U.S. Patent No. 3,289,750, which is a division of application Ser. No. 202,612, June 12, 1962, now Patent No. 3,201,858. Said application Ser. No. 202,612 is a continuation-in-part of application Ser. No. 732,663, May 2, 1958, now Patent No. 3,049,795, which is a continuation-in-part of application Ser. No. 586,259, May 21, 1956, now abandoned. This application July 27, 1967, Ser. No. 656,601
U.S. Cl. 165—170                    7 Claims
Int. Cl. F28f 3/14; B21d 53/04

ABSTRACT OF THE DISCLOSURE

A composite porous structure for use in chemical processes or as a heat exchanger comprising a pair of composite members each composed of an impervious metal member and a porous body disposed on and bonded thereto and having fluid passages formed between the contacting surfaces of the pervious and impervious layers, through which a fluid is passed and is diffused through the pervious body. The pervious bodies are contiguous and spaced apart to form a fluid passage therebetween in which the fluids which are passed through the porous bodies are mixed. Additional fluid passages through which temperature control fluids are passed are formed in heat exchange relationship with the impervious members.

---

This application is a continuation of application Ser. No. 499,130, filed Aug. 30, 1965, now abandoned, which in turn is a division of co-pending application Ser. No. 398,128, filed Sept. 21, 1964, now U.S. Patent 3,289,750, which in turn is a division of co-pending application Ser. No. 202,612, filed June 12, 1962, now U.S. Patent 3,201,-858. Said application Ser. No. 202,612 is a continuation-in-part of U.S. patent application Ser. No. 732,663, filed May 2, 1958, now U.S. Patent 3,049,795, which in turn is a continuation-in-part of U.S. patent application Ser. No. 586,259, filed May 21, 1956, now abandoned.

This invention relates to porous fabrications, and more particularly to a permeable body integrated to a supporting sheet metal structure adapted to conduct a fluid to the said permeable body for flow and distribution therethrough.

As brought out in the aforesaid co-pending applications, the subject matter thereof was directed to novel features wherein a permeable body formed of powdered metal is joined to a supporting metal structure so as to become integral therewith in all areas except where they are formed between the permeable and impervious portions of the structure.

The resultant porous fabrication may be utilized advantageously in various applications. For example, it may be employed in the subsequent manufacture of gas burners that are intended to provide evenly distributed heat over large surfaces. In such application a combustible gas is distributed by the fluid channels to different portions of the permeable body through which it flows to emanate on the combustion side thereof substantially uniformly over most of the surface of that body at a substantially uniform rate, thus producing a flame blanket. The resultant porous fabrication may also be utilized advantageously in the construction of evaporative coolers whereby an efficient cooling surface is obtained by using the porous metal body as a means through which to distribute over a large area the liquid which is to evaporate for the purposes of transpiration cooling. In a further application, the porous fabrication may be utilized in the construction of filters wherein the porous metal body provides a controlled porosity and permeability so as to enable a liquid carrier to filter through the porous metal body while leaving filtrate on the other side thereof. As will be recognized, one of the most important limitations restricting the use of porous fabrications resides in the fact that it is very difficult and costly to provide conduits which conduct fluids efficiently to the appropriate faces or portions of the porous metal bodies, and therefrom to be distributed into and through such porous metal bodies for the purposes of combustion, evaporation, filtration, or other purposes. Another limitation of porous metal bodies restricting their use in components designed to transfer heat from one medium to another derives from the fact that the heat conduction of such porous bodies is less than that of solid metal bodies and that it is difficult and costly to effect efficient heat transfer to the porous bodies and through them. While the techniques and methods of producing pervious or porous bodies from powder metal have been extensively discussed in the literature such as for example in "Powder Metallurgy," by Dr. Paul Schwarzkopf (The MacMillan Company, New York, 1947) and "Powder Metallurgy," edited by John Wulff (The American Society for Metals, Cleveland 1942) no economical and efficient method has been found thus far to overcome the limitations above referred to prior to the invention described in the aforesaid co-pending applications; the basic concept of the contribution therein comprises the forming of an integral structure of two or more metal layers of differing characteristics, of which at least one layer is porous and pervious to fluids, such as gases or liquids, and the others impervious and solid, these layers being secured together, preferably through a sintering operation, although brazing and other means may also be employed, so as to enable the formation of fluid channels in predetermined portions between the confronting faces of various layers comprising the integrated porous structure.

In accordance with the disclosure of the aforesaid co-pending applications, the porous fabrication is formed from a supporting sheet metal member which may have all or a portion thereof in the form of a flat, relatively thin plate, sheet, or strip. A pattern of weld-inhibiting material is applied to this member in a design corresponding to that desired for the fluid conducting channels which are to be provided in the ultimate structure. Following the application of the weld-inhibiting material, a substantial layer of powered metal aggregate is deposited upon the plate thus treated. Subsequent thereto this composite structure may be subjected to pressure to compact the powered metal and to press it firmly against the solid plate. This compacted assembly is then exposed to a suitable sintering temperature under conditions preventing undesired reactions, such as oxidation of the metal. This sintering operation accomplishes the sintering of the powered metal particles to each other together with the metallurgical bonding, welding, of the sintered metal aggregate to the solid member.

In an alternate method disclosed in the foregoing co-pending application, the powder metal layer may be separately formed by known powder metallurgy techniques. In this method the solid sheet metal member may be first prepared by applying a pattern of weld-inhibiting material to the portions thereof at which the fluid channels are to be formed, and applying to one side of the porous metal layer a suitable thin layer of soldering or brazing metal. The porous metal layer is then superimposed upon the solid plate so as to sandwich the weld-inhibiting material between them, and the composite subjected to a thermal treatment to accomplish the brazing or soldering of the porous metal layer to the sheet metal member in all adjacent areas thereof except in those portions separated by the weld-inhibiting material.

The resultant composite structure may now be adapted for the conducting of fluids by deforming or flexing those portions of the sheet metal member, which are disposed opposite the weld-inhibiting material, away from the porous metal layer. This can be accomplished for example by introducing a fluid under pressure into the ununited portions of the composite structure formed between the porous layer and a sheet metal member, or mechanically, by insertion of suitable mandrels into these areas. This deformation of the sheet metal member away from the porous metal layer will form fluid channels defined on one side by an impervious metal wall portion and on the other side by the porous metal.

As will be understood, various combinations of materials may be utilized in forming the integrated composite structure; and accordingly the solid sheet metal member and the porous layer or body may be of the same metal or alloy, or the porous structure and the solid member, of the integrated structure, may be comprised of different compositions. For example, both the porous metal layer and a solid sheet metal member may be formed of the same stainless steels, coppers, brass, carbon steels, aluminum or various combinations thereof. As will be understood the ultimate use of the resultant integrated structure determines the specific combination of alloys to be employed.

Accordingly, among the objects of this invention is to provide a novel fluid permeable porous metal structure adapted to distribute a fluid and heat in flow therethrough.

Other objects and advantages of this invention will become more apparent from the following drawings and description in which FIGURES 1 to 6 illustrate various steps in the practice of one embodiment of this invention;

Figure 1:
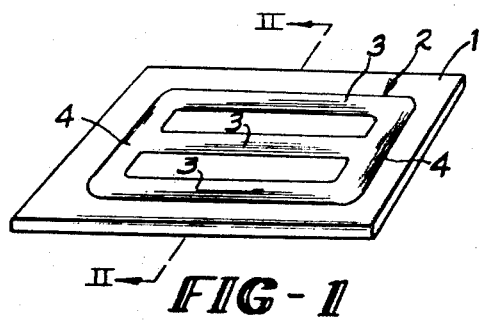
Figure 2:
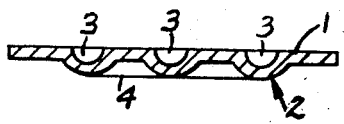
Figure 3:
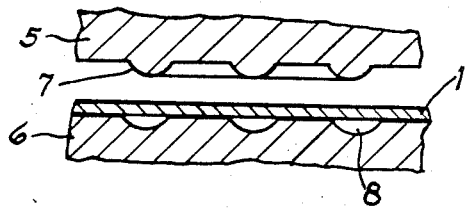
Figure 4:
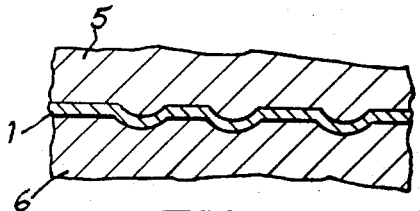
Figure 5:
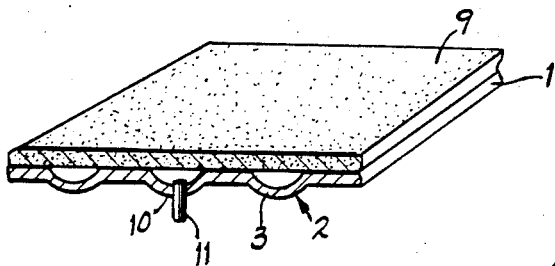
Figure 6:
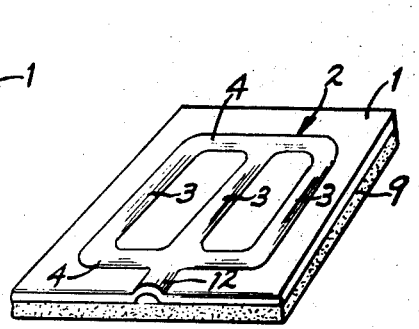
Figure 7:
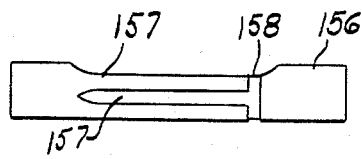
FIGURES 7 to 11 illustrate another embodiment of this invention in a gas burner.
Figure 8:
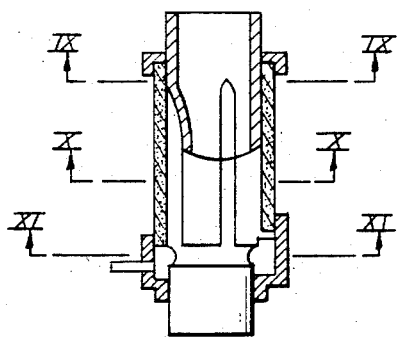
Figure 9:
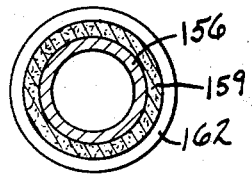
Figure 10:
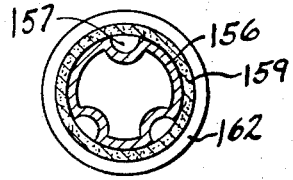
Figure 11:
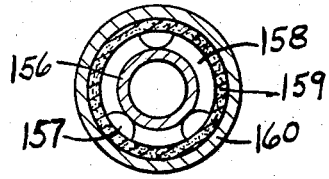

Referring to the drawings FIGURES 1 to 6 are illustrative of one embodiment of this invention wherein a metal sheet 1 is suitably embossed at 2 in a pattern corresponding to a desired system of fluid channels desired for the distribution of a fluid in the ultimate structure. For example the embossment may comprise a plurality of coextending tubes 3 interconnected at each adjacent ends by a transversely extending portion of header 4. However, it is to be understood that although a simple pattern has been illustrated, it may nevertheless be of any configuration and of any degree of intricacy. In addition the embossment may be provided in accordance with any of the conventional practices known in the art, for example they may be formed between a pair of complementary dies 5 and 6 which are mounted in operative relationship to conventional reciprocating presses, not shown, such as normally used for punching or embossing. In the usual manner, when dies 5 and 6 are closed against sheet 1, a pattern corresponding to the die impressions 7 and 8 will be impressed in strip 1. It is noted that the conditioning of strip 1, embossing, may also be accomplished in a continuous manner, for example, the strip 1 may be continuously fed between a pair of rolls having their cooperating surfaces machined to a pattern corresponding to a desired die impression such as that shown for the aforedescribed dies 5 and 6. Subsequent to the provision of the desired embossments in metal sheet 1, a sheet-like preform body of sintered porous metal 9 is superimposed on sheet 1 so as to dispose the groove-like indentations of the embossments in extension away from the sintered porous body 9.

In this manner these groove-like indentations will protrude out of an external face of the assembly. Subsequently, the embossed sheet metal member 1 suitably unified to the superimposed porous body along the unembossed portions of sheet metal member 1, as for example in accordance with the above discussion of the disclosures contained in the aforesaid co-pending application. In such manner the unification may be accomplished by thermal treatment to obtain a molecular bond between sheet metal member 1 and the porous metal body 9, or suitable brazing or soldering material may be coated on and along the unembossed portions of sheet metal member 1, followed by conventional thermal treatment to accomplish the desired unification between these components.

In regard to production of the porous body, it may be obtained by the so called gravity sintering method which comprises a process wherein graded metal powder, frequently spherical metal powder, is poured by gravity into an appropriately shaped confined space, and usually vibrated to cause it to compact uniformly. As is obvious the choice of particle size of the metal powder will largely determine the amount of porosity, i.e., void space. The metal powder or aggregate so packed is then sintered in accordance with well-known powder metallurgy practices, producing a porous metal body whose bulk density, or apparent density, is but a fraction of the density of the metal or alloy from which the powder particles are obtained. Generally the conditions of vibration and conditions of sintering are chosen to result in an apparent density of approximately 25% to 75% of the solid density of the corresponding alloys. In another procedure for the production of such porous metal bodies the process may comprise blending intimately a graded metal powder with a combustible substance, such as for example wood flour or other organic particulate material, or a soluble material whose melting point exceeds the sintering temperature of the metal powder. After the formulation of this dry blend, the mixture of metal powder and combustible or soluble substance is then compacted under pressure, such as by rolling resulting in a body that has no voids and is reasonably firm, sufficient for handling. This body is then sintered in accordance with well-known powder metallurgy practices to produce a cohesive structure in which the metal particles are sintered together at their respective points of contact and the combustible or soluble material remains unbonded to the metal particles forming discrete islands within the metal body. Upon completion of the sintering operation and if the non-metallic component is combustible, then the resultant body will in fact contain void spaces everywhere previously occupied by the combustible material since the latter will have burned away in the course of sintering. In the case utilizing a soluble material whose melting point is higher than the sintering temperatures of the metal, the soluble material will remain intact after the final stages of sintering and can be subsequently removed by leaching and dissolving with a liquid, resulting in a network of interconnected pores.

In the modification of the foregoing it is noted the above described dry blend of metal powder and combustible or soluble substance may be replaced, respectively, by a paste or slurry obtained by suspending the admixed powder metal and combustible or soluble particles in a suitable liquid vehicle, as for example water or alcohol; or in applications where the combustible substance is mostly organic, by choosing a combustible substance that is a viscous liquid instead of being particulate such as for example a liquid phenolic resin. Alternately the mixtuure of metal power and void or pore forming substance and vehicle, or void or pore forming substance alone, may be prepared into a paste which may be brought into the desired shape by pressing or extrusion.

A further method of producing the sintered porous metal bodies comprises melting a metal or alloy and casting it into the interstices of a porous aggregate of a particulate soluble material whose melting point exceeds that of the metal. Upon solidification of the metal, a component is produced which contains the network of the soluble material interspersed within the solid metal which soluble material is thereupon removed by leaching or dissolving, leaving behind it interstices that interconnect and form a porous network within the resultant metal body. Soluble substances contemplated for these purposes, be it for blending with solid metal powder or for the above casting process, comprise sodium chloride in conjunction with aluminum and aluminum alloys, aluminum fluoride in conjunction with copper alloys, and calcium oxide in conjunction with alloys having melting points higher than copper alloys. As will be understood other substances, particularly inorganic salts, are readily available and known to the art for such purpose as for example various phosphates, such as tri-sodium phosphate.

A still further method of producing a porous metal body comprises weaving or knitting metal wire into a mesh arranged in a plurality of layers. According to this process, a control of porosity is obtained by appropriate choice of wire diameters and openings arranged between adjoining wires as well as the juxtapositioning of superimposed layers of the woven or knit mesh.

After joining and unifying the embossed sheet metal member and the porous body, the resultant integrated composite structure may be adapted for receiving a fluid by forming an opening 10 through the wall in any of the groove-like indentations followed by the insertion of a suitable inlet conduit 11 which may in turn be connected to a source of fluid, such as a combustible gas.

In addition the sintered integrated composite structure may be adapted for receiving a fluid by modification of the pattern of embossments 2 by providing to the embossments an extension thereof 12 which may be inclined so as to terminate at an edge of the unit either with or without trimming thereof. As in the preceding embodiment, in this modification a similar inlet conduit may be fitted into the terminal opening of extension 12.

Although a specific mass of sinterable metal has been described, it is pointed out that other formulations of sinterable materials may also be used, as for example those metal oxides, carbides and nitrides, or mixtures thereof, containing if necessary pore or interstice forming materials discussed above. The unification of various components of this embodiment may be accomplished by sintering at temperatures sufficient to sinter the particulate substance within itself and to the unembossed portions of sheet metal member 1, in other words in all regions in which the two bodies are in contact, whereby no unification occurs in the regions represented by the grooves which are filled with a spacer or supporting substance.

Various substances are known to be effective in preventing adhesion of one metal body to another, even under severe pressure, as in rolling, at elevated temperatures, as in the course of soaking prior to rolling, or diffusion-annealing, etc. In fact, many substances present in metal as accidental impurities, as for example manganese sulphide in steel, operate to produce seams and other discontinuties in rolled products. Among these substances are graphite, applied for example in the form of colloidal suspensions, boron nitride, talcum, zinc oxide, titania, and many others, each within certain limits of applicability that are not relevant here. In fact, it has been noted that on occasion during roll-welding of two superimposed sheets interference with the integration occurs even by the mere presence of an accidental oil smudge on the surfaces of the sheets. For purposes of the present invention, the separation or weld-inhibiting materials employed need not withstand exposure to high pressures or be capable of extending under pressure which normally are requisites of stop-weld resist used in pressure welding. Instead, the weld-inhibiting material employed as the spacer or supporting substance herein need only have reasonable mechanical strength to function as a spacer or support before the superimposed particulate material acquires strength of its own as the sintering operation progresses. The weld-inhibiting material employed as a spacer or supporting substance should preferably be capable of being applied at room temperature as a powder or by spraying, painting, extrusion, etc.; if needed, harden with the least time delay, and remain in place through the better part of the subsequent operations which usually comprise the application of a loose particulate metal layer of transporting the composite preparatory to a sintering operation and of sintering. Moreover, this spacer or supporting substance must be capable of removal following the sintering operation even if the channel network is extremely complex and tortuous.

Preferably the spacer or supporting substances contemplated herein are liquid soluble and have a melting point higher than the sintering temperature of the particulate metal layer, or at least higher than the temperature at which that layer commences to acquire reasonable mechanical strength in the course of sintering. Such soluble substances are for example sodium chloride, which melts at 801° C., a temperature somewhat below the customary sintering temperature of copper; and it may be used in connection with copper aggregate because the latter will acquire adequate strength during sintering before the sodium chloride begins to melt. Other such soluble substances are sodium aluminate (melting at 1650° C.), potassium sulphate (melting at 1076° C.), sodium metasilicate (melting at 1088° C.), aluminum chloride (melting at 1040° C.), and others. The choice of such soluble spacer or supporting substances will of course also depend on possible solid phase reactions with the metal surrounding them, at the temperatures of sintering. For example, while one of the most effective weld-inhibiting materials adapted for use as the spacer or supporting substance in connection with copper and aluminum alloys is graphite or carbon, austenitic stainless steel would be harmed by that spacer substance through carburizing.

In this respect it is pointed out that also contemplated within this invention is the utilization of a specific form of a carbon as a weld-inhibiting material in the fabrication of these composite structures. The particular form of carbon contemplated is that obtained in situ, from organic substances, by pyrolysis. As is known, progressive elevated temperature exposure of a variety of organic substances in inert or reducing atmospheres results in progressive thermal degradation of the organic material and ultimately in pyrolysis similar to coking. The residual carbonaceous matter is strong and cohesive as well as stable, except under oxidizing conditions at elevated temperatures. The resultant weld-inhibiting material, originally introduced as an organic substance may thus maintain reasonable mechanical strength and its functional integrity not only at room temperature but also throughout the process of heating during the sintering operation, while the powder metal acquires appreciable strength and ability to support itself over a preformed channel forming the groove of the desired composite structure. However, the organic material applied to the solid metal surface or within the preformed channel of a solid metal member, may be used as a weld-inhibiting material only if the carbonaceous residue remaining after the sintering operation is removable. This in turn depends upon the particular metal aggregate applied above it which must be pervious and porous enough to permit the ambient atmosphere to react freely with the contents of the channels. In such a case, the pyrolyzed organic substance will break down further and oxidize without residue, if the sintering furnace atmosphere is adjusted to allow for progressive formation of gaseous carbon compounds, or, as is preferable, if exposed to air while still hot enough to oxidize vigorously.

As will be understood, the selection of materials from which the porous and solid components are made to comprise the structures described herein and in the co-pending application, is based on considerations wthin the skill of persons acquainted with mechanical, physical and chemical properties of materials. While the structures described herein have been identified as being metallic on numerous occasions, it is pointed out that all or parts of these structures may be made of non-metallic materials, as called for by their intended use. Thus, the porous layer may incorporate catalysts, as pointed out in the co-pending application, which catalysts may be non-metallic. The porous layer may also consist in part or entirely of glasses, carbides, nitrides, oxides, or borides, for example in instances calling for heat resistance, corrosion resistance or insulating properties not available in metals and alloys. The porous layer may also consist of synthetic polymeric substances, for similar reasons, as for example sintered porous fluoro-carbon resins, silicone resins, and others. The solid component is usually made of metal strip or plate which may be coated with non-metallic materials of the kind referred to. In instances not calling for high strength the solid component may also be made of synthetic resins made into strip, sheet or plate stock.

Several of the embodiments described herein may be made advantageously of non-metallic components. Thus, a component intended to distribute highly corrosive inorganic acid vapors may be made of fluorocarbon resins; another intended to serve as diffuser of combustible gas also acting as a radiant burner may be made in part of silicone carbide. Other examples are obvious to those skilled in the art of constructing components to be used in environments of high temperature and corrosive attack.

It will be understood that the porous layer referred to herein may be produced in still additional ways either in situ, upon the surface of a solid component or separately, to be joined thereto. Thus, the porous component may be produced by mechanical perforation of a solid metallic sheet, however, such a method would generally be expensive and cumbersome. The porous layer may also be produced by spraying of metal by techniques well-known to those skilled in the metal working art and carried out either with a wire gun or a powder gun, whereby through appropriate and well-known adjustment of the spray gun, the spraying process may be directed so as to produce a porous sprayed deposit. A porous sprayed deposit may also be produced with a powder gun by spraying along with the material intended to form the porous layer and intimately intermingled with it an evanescent solid which will be deposited along with the rest of the sprayed material and which may then be removed from the porous composite by leaching as described in previous examples. However, this procedure of producing the porous layer by spraying is also cumbersome and expensive in most instances, compared to the other means described herein and in the co-pending applications.

As indicated above, the composite structures of this invention are adapted for many applications and particularly for use as heat exchangers. As is well known, tubular components used in heat exchangers were heretofore usually provided with fins, corrugations and other extensions of their surface so as to present as economic maximum extended surface area for a given weight of heat exchanger structure. However, such heat exchanger structures can be provided with greatly increased heat transfer surfaces by, i.e., heat conductive bonding of a solid sheet metal unit to a sheet-like layer of sintered porous metal in accordance with any of the methods described heretofore. As has been discussed the sheet-like porous metal component is attached to the solid sheet metal unit by a metallic bond which will warrant good heat transfer with channels provided between the confronting faces of the components by interrupting the metallurgical bond in predetermined areas and in a predetermined pattern. These channels serve to conduct a fluid between the solid and porous layers with subsequent diffusion of flow through the porous body, thereby contacting the large surface area within the porous body, as defined by the innumerable interstices extending between the integrated particles of the porous body. For example for application in refrigerator systems, where the solid sheet metal unit is internally laminated with its laminations distended into a system of fluid passageways, the fluid contained within the solid metal component may be water and the fluid contained within the channels may be liquid refrigerant or refrigerant vapor, as would be the case when such composite structures are used as refrigeration condensers or evaporators.

Among the many applications to which the invention lends itself are novel gas burners in which combustible gases or partly or entirely vaporized combustible liquids are caused to flow through the fluid channels formed between the solid and the porous components of the composite structure. As indicated above, such combustible fluids conducted in this manner will permeate the porous component and, diffusing therethrough, distribute themselves uniformly on the external face thereof. Such fluids may be ignited at the time they emerge at the external face of the porous component, adapting the entire unit for use as a gas burner with characteristics of very uniform distribution of the flame. In addition, with appropriate choice of conditions during combustion, and appropriate adjustment of pressures, fuels and materials, it is possible to adapt the structure as a source of radiant heat, provided the structure is allowed to reach a temperature at which it is capable of radiating heat at an appreciable rate.

In accordance with one embodiment of this application illustrated in FIGURES 7 to 11 sheet metal tube 156 is provided with a pattern of channels comprising longitudinally extending grooves 157 interconnected to a circumferentially extending groove 158. Thereafter the tube may be surrounded by a cylindrical envelope of sintered porous metal 159 with the two components bonded together at the unembossed portions of the tube 156. The burner is completed by the provision of a manifold ring 160 disposed to encompass the header groove 158 and adapted to be provided with an inlet conduit 161. If desired, the burner may be reinforced by the provision of a retainer ring 162 disposed to assist in strengthening the burner and to further contain the gaseous medium flowing through the porous component. The resultant structure will have a manifold which is arranged to interconnect channels disposed between the solid and the porous component layers and through which manifold, combustible gases are caused to flow into the channels to be distributed through the porous component, whereupon, on emerging from the external face of the porous component, the gases may be ignited.

Preferably, the burner will be so arranged so that the tube will be disposed in an upright position and made to function as an air aspirator, so that as the burner gradually heats up, so will the air contained within the tube. In this manner the air will rise and in so doing, cause cool ambient air to enter the tube. Thus, a cooling air stream will be set up to flow through the tube to effectively cool the structure during the burning of the combustible gas.

Alternately, if desired, a coolant, such as water, may be caused to circulate through the solid tube to cool the structure while the gas burns. A specific embodiment for the foregoing application comprised a burner of approximately 11 inches long, 0.75 inch in diameter with a $\frac{1}{16}$ inch thickness in the porous component enveloping a $\frac{1}{16}$ inch thick solid tube. In operation, this specific embodiment produces a heat output of 1,750 B.t.u./hour/square inch per effective outer metal surface, with the combustible gas comprising a gas-air mixture ratio of 1:10 under a pressure of 2 pounds per square inch. As can be observed, such a burner output is very appreciable as compared to other gas burners of equal size, weight, and cost. In addition, it is noted that the flame produced was highly controllable and, at the proper setting, completely uniform in blue. In modification utilizing water circulation through the center of a tube, the overall structure was cool to the touch even after the burner had been operating for an appreciable length of time.

In an additional experiment, the same burner was surrounded by a cylindrical screen made of stainless steel at a distance of approximately 1/8 inch to 1/4 inch from the external surface of the porous component. The screen being heated by the flame, emerging from the burner body, radiated heat at approximately 1500° F. while the burner operated as noted above. The specific burner tested was made of copper and could therefore not have served as a radiating body by itself. However, had it been made of stainless steel, then its temperature could have been allowed to rise sufficiently for the burner of itself to act as a radiant body instead of using an external wire screen cylinder for this purpose.

It is also noted that an additionally improved burner structure can be made by the following modification: radiant burners, known as flame tubes or radiant tube burners, operate by injecting a gas and air mixture in one end of a tube which may be several feet long, with sufficient velocity for the flame to propagate over the entire length of the tube, heating the tube internally to a temperature at which the walls of the tube will radiate heat. Such radiant tube burners are frequently used in industry, as in heat treating furnaces where they combine the efficient heating with containment of the combustion atmosphere. The heating efficiency of such radiant tube heaters may be substantially enhanced by providing rough inside walls in the tubes causing appreciable turbulence to take place. Unfortunately, flame impingement and the erosion caused by it will usually obliterate any surface roughness within the tubes and after a comparatively short time, such internally roughened tubes will be no better than ordinary radiant tube heaters. In light of this, such structures may be improved by applying a comparatively smooth but pervious porous metal component in the form of a layer on the inside of the tube with fluid channels disposed between the tube and the porous component, in a manner similar to that employed in the preceding embodiments, except, of course, for the fact that the porous metal component here is inside of the solid tube, whereas it has been described as being disposed on the external surface of a face with regard to the specific burner embodiments discussed before. Such modification of the tube adapts it to similar use as any other radiant burner tube, in other words, a flame is caused to propagate within the tube from one end; however, in this instance, either additional fuel or air is also caused to flow through the channels placed between the porous metal component and the solid tubular structure, and to intermingle with the gases of the main flame stream. In this manner, this secondary supply of gas will "spoil" the smooth flow pattern of the main gas stream, resulting in turbulence at the boundary adjoining the powder metal layer. Thus, the same result is accomplished as in prior attempts to roughening the interior of the tube, but in contrast providing better control and without accompanying wear and erosion. In addition, the turbulent layer in accordance with this improvement enhances a measure of protection in improving the life of the burners.

In addition, burners may also be made from the composite structure by integrating sheet metal structural components and burners into one piece with greater convenience. Thus, for example, the inner wall of an oven may be constructed from sheet metal that in the appropriate parts is covered with the sintered porous metal component having channels connected to a gas supply. Thus, instead of a few specific burner units which are now normally used in corresponding applications and which cause local overheating and poor temperature distribution, a very uniform source of heat may be provided over a large area.

Figure 12:
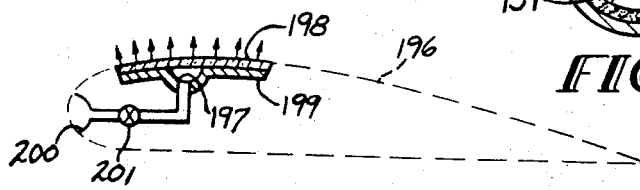
FIGURES 12 and 13 illustrate a further embodiment of this invention in aircraft wings.
Figure 13:
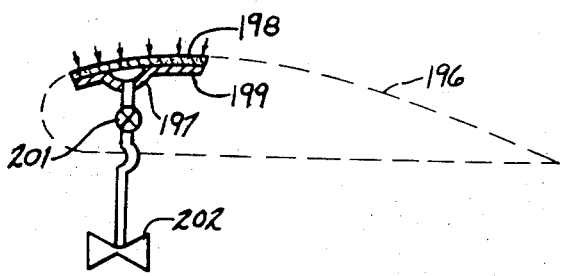

In addition, the porous composite structures of this invention may be utilized in affecting the flow characteristics of a fluid stream. It is well known that the interface of a solid surface and a fluid flowing over it, parallel to the surface, influences the flow characteristics of the fluid stream. If the surface is part of a wing of an aircraft, an uncontrolled turbulent boundary layer will decrease the efficiency of the wing. If the surface is part of a structure exposed to a stream of water, then a turbulent layer will cause undesirable effects such as cavitation, erosion, etc., and where such structure is a heat exchange apparatus, turbulence will improve the rate of heat transfer. Accordingly, it is also proposed by this invention to affect the flow characteristics of a fluid stream flowing over a surface by utilizing the porous composite of this invention either to inject a secondary fluid into the fluid stream or to suck off a part of the fluid stream. Thus, by use of the porous composite of this invention, it is possible to inject a secondary stream of fluid into a primary stream thereby creating a turbulent layer or increasing an existent turbulent layer and causing the respective structure to act as a brake (same as the so called spoilers) for aircraft, or to improve heat transfer. For example, as schematically shown in FIGURES 12 and 13, where the porous composite of this invention forms part of the surface of an aircraft wing 196, a secondary fluid may be injected into the fluid stream at the boundary surface of the wing through a porous composite from a suitable pressure source. In this manner, the secondary fluid is injected into the fluid channels 197 disposed between the confronting faces of the porous component 198 and the solid component 199 and thence to the porous component and through it to be injected into the primary fluid stream. The secondary fluid may be supplied from any convenient source such as a compressor or an air scoop 200 forming part of the aircraft structure with the flow of the secondary fluid controlled by any convenient means such as a control valve means 201.

FIGURE 13 illustrates a similar embodiment wherein the porous composite structure is utilized to bleed off or withdraw part of the fluid stream flowing past the aircraft wing 196. In this embodiment the fluid channels 197, contained between the porous component 198 and the solid component 199, are connected to any well-known vacuum means, such as a pitot tube 202.

Figure 14:
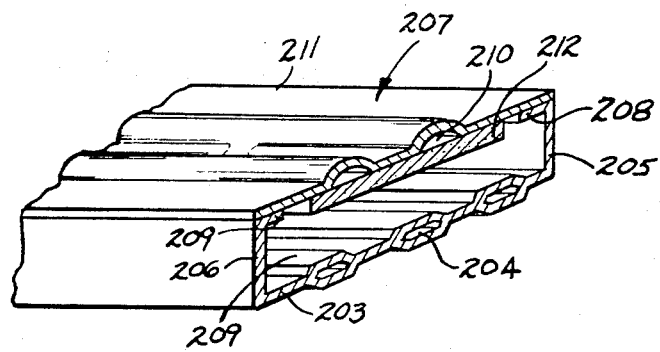
FIGURE 14 illustrates a still further embodiment of this invention in affecting the heat transfer rate of heat exchangers.

FIGURE 14 illustrates the application of this principle to affecting the heat transfer rate of heat exchangers. An example of such a structure may comprise a suitable integral sheet metal heat exchanger 203 provided internally thereof with a system of fluid passageways 204 having flowing therethrough an appropriate refrigerant, and having lateral portions of the sheet metal unit 203 bent upwardly to form sides 205 and 206 of a conduit for a secondary heat exchanger. The secondary fluid conduit is completed by the securement of a porous composite structure 207, of this invention, on to inwardly extending flanges 208 and 209 provided on side walls 205 and 206. In operation a secondary heat transfer fluid is caused to flow through the conduit defined by the sheet metal unit 203 and the porous composite structure 207; and the flow characteristics of the secondary fluid may be suitably altered by injection therein of a tertiary fluid introduced into fluid channels 210 disposed between the confronting faces of the solid sheet metal component 211 and the sintered porous component 212 whereby the fluid diffuses through the porous component and is injected into the fluid stream of the secondary fluid.

FIGURE 14 illustrates the use of a similar structure for evaporation cooling of a surface, wherein a solid sheet metal component containing an internal system of fluid passageways 204 is arranged parallel to and in spaced relationship with a composite structure made according to any of the previous embodiments containing fluid channels 210 disposed between the solid and porous components of the composite structure. The solid component of the composite structure may be heated by external means, not shown, from the side opposite the face to which the porous component is joined. A liquid having a boiling point near that temperature which it is desired that the solid component not exceed, is caused to flow through channels 210 and evaporate in contact with the porous layer which the liquid may reach from said channels. By its evaporation which is enhanced by the large area provided in the void spaces of the porous layer, the liquid will cool the composite structure and tend to remove the heat imparted to it by external means, as aforesaid. The vapor resulting from the evaporation of the liquid will emerge at the surface of the porous component at the side opposite to the face joined to the solid component ino the space between the composite component and the solid sheet metal component containing passageways 204. A refrigerant liquid being circulated within the said passageways, the temperature of the solid sheet metal component may be controlled suitably to cause condensation of the vapor against that surface of the solid sheet metal component which is juxtaposed to the porous layer. The resulting condensate may be caused to run off the said surface and it may be recirculated through the channels of the composite component.

Figure 15:
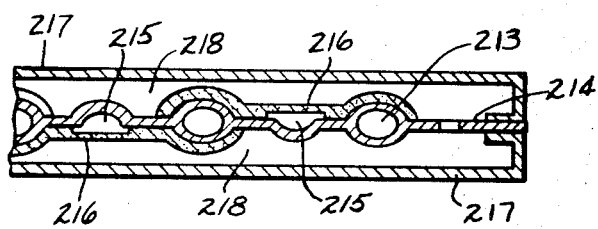
FIGURES 15 and 16 illustrate an additional embodiment of this invention in an evaporator element suitable for use in refrigerant structures.
Figure 16:
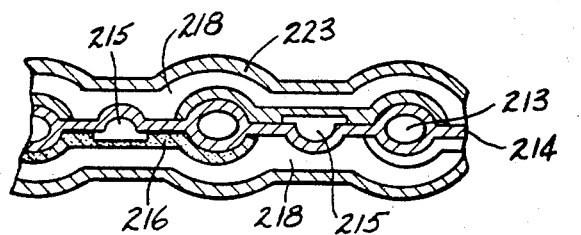

FIGURES 15 and 16 illustrate the application of this principle to an evaporator element suitable for use in refrigerant structures. As illustrated therein the tube sheet is formed, in accordance with any of the above embodiments, with water passages 213 defined by internally extending fluid passageways in an integral sheet metal unit 214, and U-shaped refrigerant passages 215 defined by fluid channels formed by embossing the sheet metal unit 214 to dispose these channels between the solid sheet metal unit 214 and the porous component 216. The flow of a refrigerant through fluid channels 215 may be further controlled by modifying the permeabiity of that portion of the porous component disposed opposite fluid channels 215, by any one of the readily available techniques of sealing, compacting, etc. The entire solid-porous composite is then enveloped within a sheet or enclosure 217 spaced from the evaporator unit itself to allow a vapor space 218. In operation, a refrigerant is introduced through fluid channels 215 whereupon it flows sideways into contact with the permeable porous components which further distribute it by capillary action as well as by a pressure differential. In flow, the refrigerant is heated by the water in the fluid passageways 213 and caused to boil off the surfaces, internal and external, of the porous component 216. The resultant vapors collect in the vapor space 218, wherefrom removal of the vapor may be affected in any suitable manner. As illustrated in FIGURE 16, the contour of the cover sheet 223 may be further modified in any appropriate manner to provide any additional desired control of the velocity and pressure distribution of the refrigerant and for listing purposes to facilitate economy of space of the vaporized refrigerant container. As will be evident to those skilled in the design of heat exchanger structures, the embodiments described herein as evaporators may be opperated as condensers through suitable reversal of the direction of flow of the fluid passing through the porous layers.

In addition this invention finds utility in other applications, as for example for providing means for reacting two or more fluid substances with each other. For example referring to FIGURE 17, a solid sheet member 250 containing passageways 251 is joined by metallic bond such as described in the above copending application to a porous sheet-like body 252 whereby the crests 253 represent the only areas in which the solid sheet metal member 250 and the porous sheet-like component 252 are in fact joined, thereby forming in the unjoined areas a network of channels 254 separating the solid and porous sheet-like members. It is evident that a first fluid may be caused to flow through passageways 251 and a second fluid may be caused to flow in the channel network 254 and thence to permeate the porous layers 252 flowing through it to the face of porous layer 252 opposed to the side joined to solid sheet metal member 250. It is also evident that in place of the solid sheet metal member 250 containing internally thereof fluid passageways 251, an uninterrupted solid sheet metal member may be provided without such passageways in which the channel network 254 is formed by suitable embossment of the solid sheet metal member.

For purposes of this description, the composite structure consisting of solid sheet metal component 250 and porous component 252 will be termed as composite panel 255 which in this apparatus is placed in substantially parallel face-to-face relationship, with another composite panel 256. Composite panel 256 comprises a solid sheet-like metal component 257 suitably embossed as to provide alternating channels 258 and crests 259. A porous sheet-like member 260 is joined to crests 259 with a metallic bond in the manner described in the co-pending application.

Figure 17:
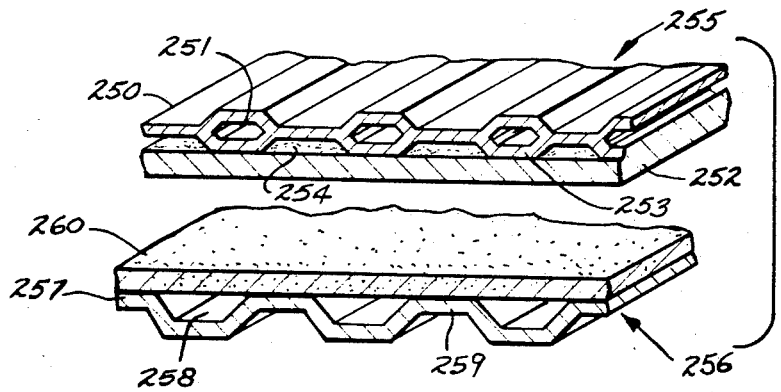
FIGURES 17 to 19 are illustrative of additional embodiments of the present invention.

Whenever required for the purpose to be described below, the present apparatus may contain a composite member 255 containing passageways in the solid component and another member 256 not containing such passageways as shown in FIGURE 17, or alternately a pair of like composite members both being of the kind of composite member 255 or of composite member 256.

The two composite members 255 and 256 are arranged by conventional structural means not shown so as to maintain their relative positions and so as to confine the space between them within a box-like structure. For example, composite members 255 and 256 may form the top and bottom respectively of a box-like structure having a rectangular cross-section, the width of which, coinciding with the width of composite members 255 and 256 may be four times larger or more than the height of side walls not shown, whose purpose it is to hold the two composite members in predetermined separation and in turn one-half or less of the length of the entire structure, it being noted that these dimensional relationships are intended to serve as an illustration only.

In use, a first fluid is caused to circulate in passageways 251 which fluid may have a closely controlled temperature which is to be imparted to composite structure 255 and through it to a second fluid which in turn is caused to flow through channels 254 into the porous layer 252 and through the latter into the space between the two composite members 255 and 256. A third fluid is caused to flow through channel network 258 contained within composite member 256 and to permeate porous layer 260 and flowing through it reach the same space confined between the two composite members 255 and 256. The second and third fluids being forced through their respective composite members at the same time will be caused to blend with each other intimately and very uniformly over the entire area in which the composite members 255 and 256 are juxtaposed. The rate of flow through the respective porous layers is controllable not only through the conventional means of valving but also through predetermined porosity of the respective porous layers and through the control of the back pressure reaching the channels 251 and 258 respectively in consequence of the flow resistance within the space that separates the two composite panels 255 and 256, that back pressure being dependent among other things upon the distance between the said composite panels which distance may be constant in any given apparatus or arranged to be variable by conventional mechanical or hydraulic means not shown.

The second and third fluids thus emerging under pressure from their respective composite members 255 and 256 will be intimately intermixed as aforedescribed and also forced to flow away at the same rate as fresh quantities of the respective fluids are entering into the supply channel network 251 and 258. Thus, a continuous transport of a blended mixture is established. The first fluid circulating in passageways 251 serves to control the temperature of the second fluid and, by virtue of the second fluid mixing into the third fluid, also the temperature of the resulting blend or mixture. If such temperature control is insufficient or if for reasons of safe and efficient intermixing of the second and third fluid, additional temperature control must be provided, then composite panels 256 may be made in the same manner as composite panel 255 to contain internal passageways within the solid sheet metal component for circulation of a fourth.

The apparatus here described is particularly useful in the continuous blending of fluids that enter into an exothermic reaction with each other, since in such an event the heat generated by the exothermic reaction may be carried away by a coolant circulated in passageways 251. Numerous reactions are known in the preparation of chemicals wherein two reactants, when brought into intimate contact react exothermically, i.e., under generation of heat, which heat in turn tends to accelerate the reaction to an undesirable degree. Such reactions could heretofore usually be carried out only in single batches whereas the apparatus here described will frequently render it possible to have such reactions take place in a continuous process, because of the greatly improved control of temperatures and rates of flow of the reactants and of the reaction products due to the improved heat transfer characteristics of the composite porous panels used and described.

Figure 18:
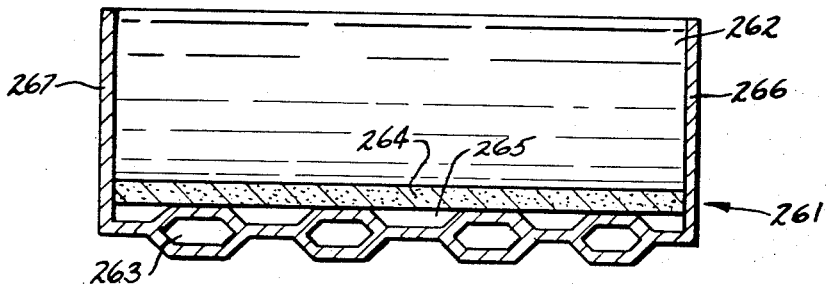

FIGURE 18 illustrates a still further aspect of this invention depicting an apparatus intended to fluidize a granular powdery or other particulate solid substance by permeating it with a suitable gas. Such fluidizing is well known in industry as for example described in a book by Donald F. Othmer entitled "Fluidization." Fluidizing is carried out for the purpose of conveying particulate solids for reacting gaseous fluids with particulate solids or for exposing a gaseous medium to the surface of solids, or for purposes of heating solid bodies by immersion, and for numerous other purposes. Fluidization takes place by causing the gas to penetrate uniformly into a mass of powdery, granular or other particulate solid material, at a pressure and rate sufficient to suspend each individual particle of the solid material upon a cushion of the respective gas. According to this invention, the device in which fluidizing is to take place consists of a composite member 261 made in accordance with any of the abovedescribed methods by joining a solid sheet metal member 262 having internally thereof a pattern of fluid passageways 263 to a porous sheet-like member 264 in such a manner that intervening channels 265 are provided. The composite porous structure 261 is then made the bottom of a container or trough-like enclosure schematically indicated by its side walls 266 and 267 into which the particulate solid substance may be placed. The gas required for fluidization is then caused to flow in the channel network 265 to be distributed from it through the porous component 264 at a uniform rate over its entire surface area into the bed of particulate solids. The temperature of the said gas may in turn be controlled by a suitable heat transfer fluid circulating in passageways 263.

Figure 19:
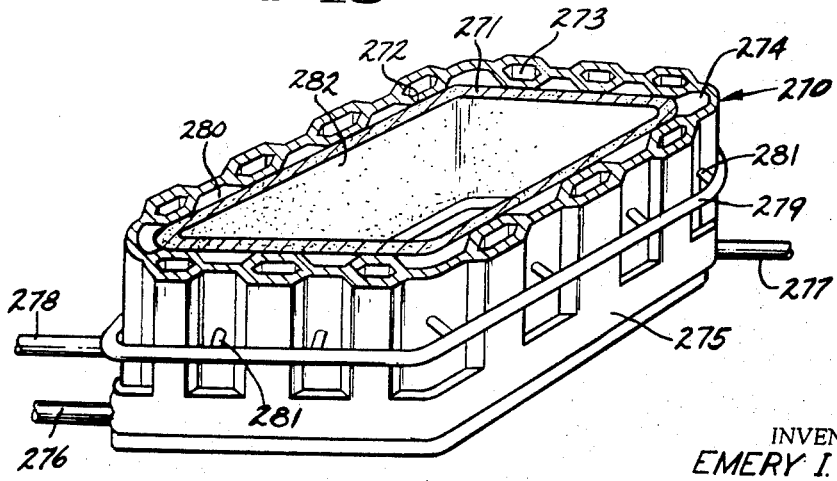

A still further application of this invention may be seen in the embodiment depicted in FIGURE 19 illustrating an apparatus employed as a chilled mold for continuous metal casting operations. It is known in continuous casting operations, such as copper and particularly steel, that the chill mold into and through which the metal is to be cast, is generally lubricated so as to prevent adhesion of the freshly chilled skin of the casting. Such adhesion is prevented by lubrication but also by mechanical means, such as by oscillation of the chill-mold and by vibration. Nevertheless it is very difficult to maintain steady and trouble-free operation, particularly in continuous steel casting, in supply lubricant. However, an effective means of supplying lubricant in such applications can be obtained by constructing a chill-mold in accordance with this invention. In the operation of such chilled dies it is contemplated to force-feed parting lubricants through the porous body and to circulate a cooling medium through the network of passages contained within the solid plate. As will be understood the pressure of the lubricant will preferably be regulated so as to produce equilibrium with the metallostatic head of the casting so that a stable separating film may be maintained.

In the specific embodiment illustrated in FIGURE 19 a vertical open-ended mold 270 is fabricated from a composite formed in accordance with this invention of a porous overlay 271 metallurgically bonded to the crests 272 of the passageways 273 contained within a solid backing member 274 with the passageways interconnected together by means of a header 275 for a coolant which is supplied by means of an inlet tube 276 suitably mounted in communicating relationship with header 275, and withdrawn by a similar outlet tube 277. Lubricant is supplied to the mold by means of an inlet 278 into a manifold 279 from which it passes into channels 280 through a plurality of feeder tubes 281 mounted in suitable parts provided in the solid portion of the backing member 274. The pressurized lubricant is then force-fed from channels 280 through the porous overlay 271 into the working face 282 thereof for its designed coaction with the ingot cast therebetween.

A similar application of this embodiment finds utility for lubrication of bearings normally referred to as oilless bearings which conventionally are normally merely impregnated with a suitable lubricant. However such conventional oilless bearings have the disadvantage in that the bearing is limited to the amount of lubricant which it may contain and which is available for supply to the bearing surface. Accordingly, conventional oilless bearings are used with this limitation in mind. However with the use of the composite structures of this invention, a continuous supply of lubricant can be supplied to a bearing surface by connecting the channeled porous body, of the composite, to a pressure supply of lubricant which is then caused to permeate through and be distributed by the porous layer to the bearing surface.

In an analogous manner an additional utility of this invention for application in chemical apparatus in order to react one or more highly corrosive substances with each other or wherein is produced through reaction of otherwise harmless substances a compound which in turn is highly corrosive. In such application the porous-solid composite of this invention can be used either to feed a separating substance, which does not enter into the reaction and does not affect its progress, so as to produce a neutral or inert separating and protective film at the walls of the vessel, or may also be used in cases where the reacting substances are in themselves harmless but the resulting substances which in turn will maintain a separating film.

The composite structure of this invention finds further peculiar application for chemical reactions by forming or incorporating into the porous component a material catalytic to the reaction. As is well known many metals, as for example copper, nickel or iron as well as non-metallic material such as alumina, serve as catalysts in a variety of reactions for the production of chemicals. In most such reactions it is important for the substances to be reacted to come in contact with the catalyst at a uniform rae and with even distribution. In many of these reactions it is also necessary to preheat one or more of the substances which are to be reacted together; and frequently it is necessary to maintain certain pressures at predetermined periods of the reaction. Control is thereby desirably maintained over the rate of supply, the uniformity of distribution, the temperature, and the pressure of the reacting substances; and the rate of removal of the products.

The channels of the porous-solid composite structure of this invention lend themselves for close control of distribution of fluids and feed rates of fluids over large areas. And, as shown above, the composite structures also lend themselves to the construction of very efficient heat exchangers and heating devices. Accordingly, whether in combination or by themselves, these two uses of the channeled porous-solid composite structure of this invention may be further combined for use in catalyst reactions by incorporating into the porous component catalysts appropriate to the desired reaction. Thus, for example, in producing the composite structure, the powdered metal employed may incorporate a metallic or nonmetallic catalyst in appropriate quantity. And, as will be appreciated, in case of exothermic reactions, it is possible to effect control of temperature by appropriate cooling, of the channeled porous component, by circulating a fluid through passageways provided within the solid component as described above. In like manner, when necessary, heating may be accomplished similarly.

A particular effective device can be constructed by placing in a manner similar to that shown in FIGURE 17, two channeled porous-solid composites, of this invention, parallel to each other, with the porous components face-to-face, in close proximity. Assuming a reaction to take place between two fluids, one of these will be caused to flow through the channel network of one composite and the other fluid through the channel network of the second composite, with the fluids issuing in each case at faces of the porous components at a uniform rate and evenly distributed. Thus, there will be intimate mixing of the two fluids in the space between the composites, one or both of which may incorporate a catalyst, with provision for removal of the reaction product from between the composite, as for example by pumping for fluids; the reaction may proceed on a continuous basis aided, if necessary, by appropriate temperature as above mentioned. The flow of the reacted fluids may be turbulent, for more effective intermixing and heat transfer, by adjusting the rate of flow and through use of the rough powdered metal surface. As will be understood, such a device may be used with or without incorporating a catalyst into the porous component, as a convenient apparatus for reacting two or more fluids with each other.

In similar manner the porous-solid composites of this invention find further utility in the chemical field, in distillation and filtering operations. Thus they find application in the construction of fractionating towers, which as is known, are built at the present time to contain a series of trays, in some instances equipped with a great number of so-called bubble caps, and in other cases of corrugated multi-layer expanded metal lath constituting a packing. Both types of towers are extensively described in the literature.

In application for fractionating columns the composites of this invention may readily be used as the trays thereof. Thus the vapor entering the fractionating tower would be directed under pressure through the channel network of plates, defined between the porous and solid components, and emerge through the porous component. The porous component in turn would be covered with a film of the liquid phase and thus uniform contact would be established between the liquid and vapor phases. The process would be repeated in the conventional cascade manner, and of course the plates themselves could be arranged to provide for drainage of the liquid phase from one tray onto the next in a manner conventionally used at present in fractionating towers utilizing bubble traps. The varied and diversified possibilities of manifolding, possible in the composites of the invention provide a very desirable advantage in that the effects of pressure drop could be offset through appropriate design of the channel network and its connection to the manifold or collector passages.

The composite of this invention also finds application in filtering operations, as for example in extracting a liquid from a mud or slurry. Such devices are presently usually of two types: plate filter presses or rotary filter presses. In the former, parallel plates are arranged and provided with holes, or other appropriate openings running within the walls of the plates (as for example in cast plates which are cored), and a permeable but reasonably dense barrier material applied over these plates (e.g., canvas). The slurry or mud is allowed to flow between two parallel plates and pressure applied so as to exert a squeezing force upon the slurry or mud between any two adjoining plates. Thus the liquid will be pressed through the barrier material into the holes or passages contained within the plates and drained off. The residue usually called filter cake, is then removed mechanically. In a rotary filter press, a large drum is used whose periphery consists of a perforated plate. A barrier material, as canvas, is usually applied over the drum, the assembly placed within a chamber in which it may rotate and in which pressure may also be applied. The mud or slurry is then introduced into the annulus between the housing and the drum, pressure applied, the liquid allowed to drain off inside the drum, and the filter cake, which adhered about the drum, scraped off on the outside of the drum. In both instances such devices are presently subject to maintenance and replacement of components. Although permeable metal filters, i.e., a powdered metal filter, appear adaptable for such application, they have not found general acceptance in that none have lent themselves for fabrication of sufficient strength to withstand the pressures required in the filtering operations. However, the composites of this invention may provide sufficient strength for such applications wherein a plurality of such composites may be squeezed together thereby forcing the liquid, in a slurry, to permeate the porous component and to drain off in the channels contained between the porous and solid components.

Further, the composites of this invention are also applied for use in processes for catalytic cracking of crude oil wherein the oil must be preheated before entering the cracking tower. This is normally accomplished in so-called oil-heaters which are at present simply comparatively large diameter coils through which the oil is caused to flow. At the center of a coil of this kind, there is placed a single burner shooting a flame as high as the coil which is many feet high and the contents of the coil are then heated through convection and radiation from the luminous flame. This is of course a rather inefficient type of structure, in comparison to similar applications of this invention which comprised a composite burner construction in the form of a tube with the oil caused to circulate through the center of the tube which is continued by appropriate piping spirally wound about the tube wherein the fuel is fed into the channels, between the porous and solid components, and burned at the surface of the porous component.

In the foregoing chemical application it is to be understood that porous and solid components may be of any suitable combination of material. Moreover, the porous component whenever used as a diffuser of gas or as an evaporator may be made as a composite of powdered metal and a catalyst to influence the reaction or made of a combined substance which not only serves as a permeable member but also influences the reaction in some way other than by catalysis.

Although the invention has been described with reference to specific embodiments, materials and details, various modifications and changes, within the scope of this invention, will be apparent to one skilled in the art and are contemplated to be embraced within the invention.

What is claimed is:

1. A composite porous structure comprising:
   (A) a sheet metal member;
   (B) a sheet-like porous body in heat exchange relationship with said member throughout the extent of said body, said body having a pair of spaced surfaces one of which is superimposed and bonded to said member;
   (C) a first fluid channel formed at least in part by said member disposed between the confronting surfaces of said member and said body;
   (D) a second fluid channel contiguous to and spaced from said first channel by said porous body and having a wall formed by the second surface of said porous body;
   (E) a third fluid channel contiguous to said first fluid channel in heat exchange relationship with one of said first and second channels;
   (F) fluid flow means connected to one of said first and second channels adapted to inject a fluid into said last channel under sufficient pressure to diffuse said fluid through said body into the other of said first and second channels.

2. A composite porous structure according to claim 1 wherein said sheet metal member forms a portion of the walls of said first, second and third fluid channels.

3. A composite porous structure according to claim 1 wherein said sheet metal member is tubular.

4. A composite porous structure according to claim 1 including a fourth fluid channel contiguous said second fluid channel, said fourth fluid channel disposed between the confronting surfaces of a second sheet metal member and a second sheet-like porous body superimposed and bonded to said second member.

5. A composite porous structure comprising:
   (A) a sheet metal member;
   (B) a sheet-like porous body having a pair of spaced surfaces one of which is superimposed and bonded to said member;
   (C) a first fluid conduit disposed between the confronting surfaces of said member and said body;
   (D) a second fluid conduit contiguous to and spaced from said first conduit by said porous body and having a wall formed by the second surface of said porous body;
   (E) fluid flow means connected to said first conduit adapted to inject a fluid into said first conduit under sufficient pressure to diffuse said fluid through said body into said second conduit;
   (F) a second porous body having a surface forming a second wall of said second fluid conduit, said second porous body being contiguous to and spaced from said first porous body to form said second fluid conduit therebetween;
   (G) a third fluid conduit contiguous to said second porous body and spaced thereby from said second conduit.

6. A composite structure according to claim 5 wherein said third fluid conduit is arranged parallel to and in spaced relationship with said first fluid conduit.

7. A composite porous structure according to claim 5 wherein said third fluid conduit is disposed between the confronting surfaces of a sheet metal member and said second porous body.

References Cited
UNITED STATES PATENTS

| | | |
|---|---|---|
| 2,194,208 | 3/1940 | Moran. |
| 2,766,597 | 10/1956 | Gieck. |
| 2,946,681 | 7/1960 | Probst et al. |
| 3,297,082 | 1/1967 | Tranel et al. |

ROBERT A. O'LEARY, *Primary Examiner.*

T. H. STREULE, *Assistant Examiner.*

U.S. Cl. X.R.

29—157.3